April 15, 1924.

C. P. BREESE

AUTOMATIC CLUTCH

Filed Dec. 3, 1920

Inventor
Charles P. Breese
By Robert H. Young
Attorney

April 15, 1924.
C. P. BREESE
AUTOMATIC CLUTCH
Filed Dec. 3, 1920
1,490,505
2 Sheets-Sheet 2
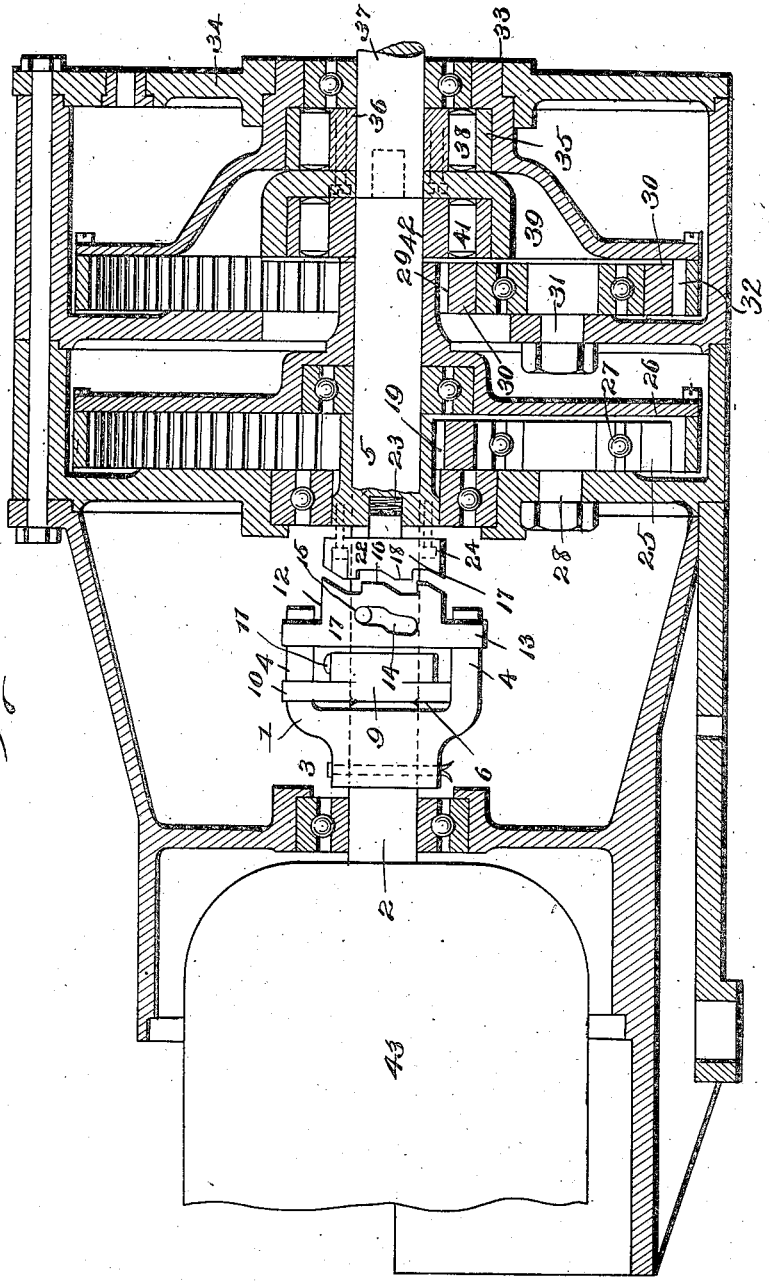

Patented Apr. 15, 1924.

1,490,505

UNITED STATES PATENT OFFICE.

CHARLES P. BREESE, OF DAYTON, OHIO.

AUTOMATIC CLUTCH.

Application filed December 3, 1920. Serial No. 428,123.

*To all whom it may concern:*

Be it known that I, CHARLES P. BREESE, a citizen of the United States, residing at Dayton, in the county of Montgomery and State of Ohio, have invented certain new and useful Improvements in Automatic Clutches, of which the following is a specification.

This invention relates to automatic clutches and is especially designed for transmitting power from a rotary shaft to a train of gears employed in this instance for the purpose of starting an engine.

It will be apparent, however, as the description proceeds, that the improved clutch may be used in other connections wherever it is desirable to automatically throw in and out of service a train of gears or a driven shaft, either in case the direction of rotation of the driving shaft is reversible or in case the functions of the driving and driven shafts are interchanged without any change of direction of rotation of either shaft.

The improved clutch provides a positive driving connection between the driving shaft and the element to be driven, prevents jamming or binding of the clutch members, and insures the automatic release of the driven member when the engine takes up its cycle of operation, the driven member then being permitted to overrun with perfect freedom.

With the above and other objects in view, the invention consists in the novel construction, combination and arrangement herein fully described, illustrated and claimed.

In the accompanying drawings—

Figure 4 is a diagrammatical section, showing the gearing for transmitting motion to the crank shaft of an engine and then transmitting motion from the engine shaft back to the motor generator.

Figure 1:
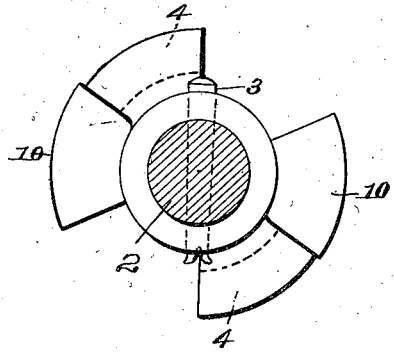
Figure 1 is a view in elevation of a portion of the clutch mechanism, showing the driving shaft in section and omitting the clutch member.

The driving member of the clutch is designated 1, and is shown as mounted fast upon a driving shaft 2.

Any suitable means may be used to fasten the driving member 1 to the shaft 2, a taper pin or key 3 being illustrated for that purpose.

The driving member 1 is formed with substantially parallel driving arms 4, two of such arms being shown arranged diametrically opposite each other and of segmental shape in cross section. In axial alignment with the shaft 2 is a driven shaft 5, the separation between the said shafts occurring at point 6, where one of the shafts is formed with a central tenon 7, while the other shaft is formed with a central recess 8 to receive said tenon. The construction just described serves to maintain the shafts 2 and 5 in alignment with each other.

Mounted fast upon the driven shaft 5 is a connection member 9, having oppositely extending radially disposed arms 10, which lie between the arms 4 of the driving member 1. In this way, driving member 1 transmits its rotary motion to the connection member 9, and consequently to the shaft 5. The member 9 may be secured to the shaft 5 in any suitable manner, as by means of a taper pin or key 11.

Mounted loosely upon the driven shaft 5 is a driving clutch member 12, having radially extending arms 13, which lie between and are actuated by the arms 4 of the driving clutch member 1. The driving clutch member 12 is formed with an oblique slot 14, which receives and works in conjunction with a projection or pin 15, on the driven shaft 5. It will thus be seen that the driving clutch member 12 has a movement longitudinally of the shaft 5 as well as a rotative movement around said shaft for a limited extent. The member 12 is formed with a clutch face 16, shown as consisting of a plurality of teeth. Working in conjunction with said clutch member 12 is another driven member 17, also formed with a clutch face 18, shown as comprising a plurality of teeth. The driven clutch member 17 is slidable to a limited extent, longitudinally of the shaft 5 and relatively to a gear 19, which—in the case of starting mechanism in an internal combustion engine—constitutes the initial gear of a train of gears. The clutch member 17 and the gear 19 rotate together, having an interlocked connection by means of cooperating clutch faces 20 and 21 on member 17, and the gear 19, respectively.

Number 22 designates a stop collar on the shaft 5 to hold the gear 19 against sliding movement thereon.

Figure 2:
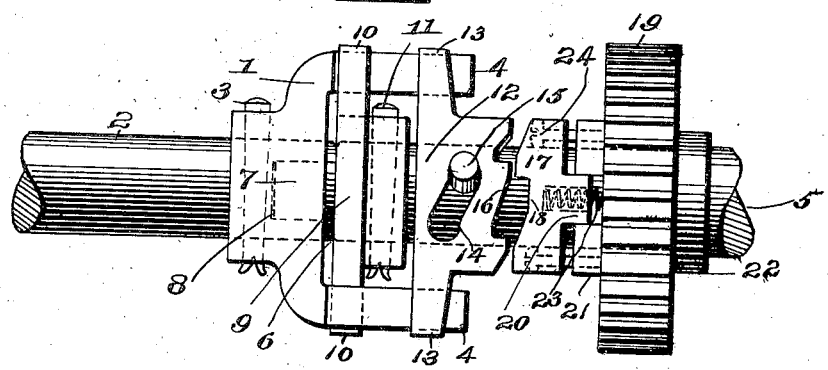
Figure 2 is a side elevation of the clutch mechanism, showing the initial gear of a train of gearing.
Figure 3:
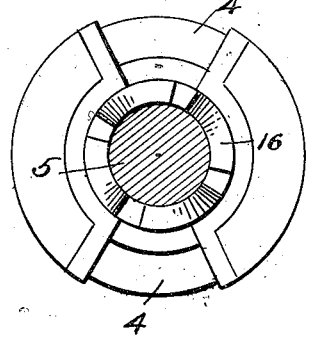
Figure 3 is a cross-section through the same, looking toward the clutch face of the driving clutch member, the driven shaft being shown in section.

Thrust springs 23 are interposed between the driven clutch member 17 and the gear 19, said springs being contained in recesses in such members as indicated in Figure 2. Said springs relieve the thrust in case the driving clutch member should first engage on the peaks of the clutch face of the driven clutch member 17.

In order to limit the movement of member 17, away from the gear 19 stops 24 are provided, the same being shown in the form of headed screws which are threaded into the gear 19, and upon which member 17 is slidable to a sufficient extent to overcome any danger of clashing between the teeth of the clutch members 12 and 17.

The mechanism for transmitting motion from the motor generator shaft to the engine shaft is illustrated in Fig. 4 and is in accordance with the mechanism illustrated and described in a co-pending application filed by me April 8, 1921, Serial No. 459,582. As shown in said Fig. 4 the gear 19 meshes with one or more gears 25, the latter in turn meshing with an internal gear 26 supported by radial ball bearings 27 surrounding shaft 28. The hub of the internal gear 26 has fast thereon a pinion or gear 29 which meshes with and drives one or more gears 30 journalled upon corresponding studs 31. The gears 30 mesh with an internal gear 32, the latter being supported in an opening 33 in the housing or gear casing 34 adapted to contain lubricant in which the gears revolve.

The hub of the gear 32 is formed with a central recess containing an annular clutch facing 35 which encircles a clutch collar 36 fastened to the engine shaft 37 and having one or more exterior cam faces which engage clutch members 38 shown in the form of rollers which afford a gripping means between the clutch members 35 and 36, the construction just described constituting an over-running clutch.

Adjacent to the over-running clutch just described, there is another over-running clutch comprising an outer member 39 which has a fixed relation to an intermediate transmission shaft 37 in axial alinement with the shafts 2 and 5. The clutch member 39 is engaged by one or more clutch members 41 similar to the members 38 and also engaged by one or more cam faces on the outside of a clutch collar 42 fastened to the transmission shaft 5. When the motor generator indicated at 43 is operating as a motor the drive is from the shaft 2 through the clutch members 12 and 17, pinion 19, gear 25, internal gear 26, pinion 29, gear 30, internal gear 32, and clutch members 35, 36 and 38 to the shaft 37. When the speed of the shaft 37, driven by the engine, exceeds the speed at which it has previously been rotating, the drive is then from the shaft 37 back through the clutch member 36, clutch members 39, 41 and 42 to the transmission shaft 5 and thence through the members 12 and 1 to the shaft 2, the device 43 now becoming a generator. When the speed of the shaft 37 exceeds the speed of the shaft 2, the clutch member 12 backs off from the clutch member 17 so that the teeth thereof become disengaged.

In operation, the power being applied to the driving shaft 2, in a counter-clockwise direction, facing the clutch from that end, the arms 4 of the driving member 1 revolve in the same direction; but the connection member 9 does not move with the driving member 1 until the arms of said members 1 and 9 come in contact with each other. During this relative rotation between the driving member 1 and the connection member 9, the driving clutch member 12 is carried with the shaft 2 in rotation, at the same time moving longitudinally on the shaft 5— the last named movement being caused by the pin 15 moving in the slot 14. This forces the driving clutch member 12 toward the driven clutch member 17 until the clutch faces thereof engage positively with each other, whereupon the members 17 and 19 will revolve with, and be positively driven by, the shaft 2. As previously stated, the springs 23 relieve the thrust in case the driving clutch member should first engage the driven clutch member 17 on the peaks of their respective teeth. Should the functions of the driving shaft 2 and the driven shaft 5 be interchanged without change of direction of rotation of either, a reverse action takes place—the clutch faces of the driving and driven clutch members 12 and 17 being thrown out of engagement with each other. The gear 19 being loose on the driven shaft 5 may discontinue its rotation while the shaft 5 continues to be driven.

I claim:

1. In an automatic clutch, a rotary driving member having segmental shaped arms, a rotary driven member, a second driven member rotatable therewith, a driven clutch member rotatable with said first driven member, a driving clutch member, a connection member fixed to said second driven member, said driving clutch member and connection member both having segmental shaped arms adapted to be actuated by the arms of said driving member and means for throwing said driving clutch member into clutching engagement with said driven clutch member before a driving connection is established between said driving member and said connection member.

2. In an automatic clutch, a rotary driving member having arms, a rotary driven member, a driven clutch member rotatable with said driven member, a second driven member rotatable with said driven member and having a connection member fixed thereto, a driving clutch member having arms adapted to be engaged and driven by the arms of said driving member, the arms of said driving member and said driving clutch member being so proportioned as to permit a limited rotative movement of said members before a driving connection is established between said driving member and said connection member.

3. In an automatic clutch, a rotary driving member having arms, a rotary driven member, a driven clutch member rotatable with said driven member, a driving clutch member, yieldable means between said driven member and said driven clutch member to permit the latter to back away from the driving clutch member, said driving clutch member adapted to be actuated by the arms of said driving member, a second rotary driven member, a connection member secured thereto and means for throwing the driving clutch member into clutching engagement with the driven clutch member before a driving connection is established between the driving member and the connection member.

4. In an automatic clutch, a rotary driving member having arms, a rotary driven member, a driven clutch member rotatable with said driven member, a driving clutch member, yieldable means between said driven member and said driven clutch member to permit the latter to back away from the driving clutch member, said driving clutch member adapted to be actuated by the arms of said driving member, a second rotary driven member, a connection member secured thereto and means for throwing the driving clutch member into clutching engagement with the driven clutch member before a driving connection is established between the driving member and the connection member, and stop means for limiting the movement of said driven clutch member away from said first named driven member.

In testimony whereof I have affixed my signature.

CHARLES P. BREESE.